Patented May 26, 1953

2,640,007

UNITED STATES PATENT OFFICE 2,640,007

PRODUCTION OF ALKALOIDS BY CLITOCYBE SUBILLUDENS

Perry A. Foote and Werner M. Lauter, Gainesville, Fla., and Ross M. Baxter, Toronto, Ontario, Canada, assignors to Research Corporation, New York, N. Y., a corporation of New York No Drawing. Application April 4, 1951, Serial No. 219,304

9 Claims. (Cl. 195—27)

This invention relates to the production of alkaloids by the culture of the mycelia of fungi in nutrient media and particularly to the production of ergot and similar oxytocic alkaloids by cultivation of the mycelium of the fungus *Clitocybe subilludens*.

We have found that this mushroom is unique in containing ergot-type alkaloids having typical physiological characteristics of a strongly oxytocic nature. This could not have been foreseen since its closest botanical relative *Clitocybe illudens* has been shown to be free of any oxytocic alkaloids. *Clitocybe subilludens* has been described and classified by W. A. Murrill in a paper appearing in the Journal of the Florida Academy of Science, volume 8, pages 180, 181 and 198 (1945). According to the "North America Flora" system of nomenclature it has been named *Monadelphus subilludens* and according to the more familiar system of Saccordo it is known as *Clitocybe subilludens*. Specimens (F19653 and F22197) are on deposit in the herbarium of the Florida Agricultural Experiment Station, Gainesville, Florida. It is found in northern Florida in the vicinity of Canary Island palms, and no other habitat is known at the present time.

The economic value of the invention is twofold. The ergot alkaloids are valuable therapeutic agents, especially ergotamine, ergonovine, and ergotoxine. The harvesting of the ergot-forming fungus from rye and other cereals is laborious, and, actually, the commercial growing of this parasite is attended with grave dangers to health; hence, no significant commercial quantities of ergot are produced within the U. S. A. This country is largely dependent upon imports, the majority of which come from Europe and are subject to fluctuating conditions of supply and prices.

The invention, therefore, provides a desirable method of producing these important medicinals under factory-controlled conditions unhampered by varying climatic or import conditions.

The mycelium grown either as surface or submerged culture synthesizes the oxytocic alkaloids but submerged culture is particularly advantageous. It is obvious to those skilled in the art that well-known methods of producing mutations, such as the use of ultra-violet light or the addition of certain chemicals may be expected to influence the type and quantity of these alkaloids, and such well-known and obvious methods are within the scope of the invention.

The yields of mycelium may be increased substantially by utilizing fruit or cereal concentrates as a partial or total source of carbohydrates in the cultures.

The following example is illustrative of the principles of the invention:

*Example.*—The production of a 40-liter batch proceeds as follows:

I. The nutritive medium

Forty liters of an aqueous solution is prepared containing:

5% dextrose
0.45% potassium acid phosphate
0.45% sodium acid phosphate
0.40% calcium chloride
0.30% potassium nitrate
Traces of iron, manganese, zinc and copper.

The pH is adjusted to 4.0–5.0.

Other sugars than dextrose may be employed, or carbohydrate containing fruit or cereal concentrates may be used instead of pure sugars.

II. Cultivation of the fungus

A sample of freshly cut *Clitocybe subilludens* is deprived of its outer skin by means of a sterile needle, and a small quantity of the layer immediately under the discarded skin is put onto an agar slant under sterile conditions. This is allowed to produce mycelium at a temperature of 26°–29° C. for 2–3 days. The purity of the culture may be increased by several transfers of the mycelium. Larger quantities are then prepared in one-liter shaker flasks employing the medium described above. After 4–5 days of growth, this material is added to the 40-liter nutrient medium and the suspension is vigorously agitated with sterile air, at a temperature between 26°–29° C. The maximum yield is reached within 3–4 days. Approximately 100 grams of dried mycelium are obtained in this manner.

If, in this example, half of the dextrose in the nutrient medium is replaced by 2 liters of a filtered orange juice concentrate containing about 1 kg. of sugars the approximate yield of mycelium is increased by about 200%.

Other substances which may advantageously be used to supply all or a part of the carbohydrates of the culture medium are cereal concentrates, citrus-press water, citrus molasses, corn steep liquor and the like.

III. Isolation of the alkaloids

Two alternative steps may be taken to isolate all or part of the alkaloids formed in the mycelium.

A. The mycelium is filtered off, dried at a low temperature (40–50° C.). The dried mycelium is moistened with a 10% aqueous aluminum sulfate solution, and then dried again at 40–50° C.

The material is then thoroughly extracted for at least 5 hours in a mechanical extractor, using hot benzene. This eliminates fats, oils and some coloring matter.

The extracted mycelium is then dried from benzene, moistened with a 10% solution of sodium carbonate in water, and dried again.

The benzene extraction is then repeated, and the alkaloids, especially ergotamine, are obtained by washing with petroleum ether. The remaining alkaloidal tartrates including ergonovine may then be further isolated.

The assay may be carried out either by recognized physiological methods or with the aid of paper chromatography, using a 77% ethanol solution as medium. The $R_F$ factor may be checked against pure ergonovine and ergotamine solutions.

B. The medium containing the suspension of mycelium is gradually adjusted to pH 8.0 with rapid agitation, after which it is filtered and exhaustively washed with water. To adsorb the alkaloids charcoal is added to the combined filtrates while stirring until a filtered sample shows no significant quantity of alkaloids in the filtrate. The suspension of charcoal is then filtered and washed with water. The alkaloids may be removed by means of a suitable acid solution, such as 1% tartaric acid in methanol. The alkaloidal tartrates may be isolated after removal of the methanol and excess tartaric acid in the usual manner.

We claim:

1. The process of making oxytocic alkaloids which comprises cultivating the mycelium of *Clitocybe subilludens* in a nutrient medium, and extracting oxytocic alkaloids from the mycelium.

2. The process of making oxytocic alkaloids which comprises cultivating the mycelium of *Clitocybe subilludens* in submerged culture in a nutrient medium, and extracting oxytocic alkaloids from the mycelium.

3. The process of making oxytocic alkaloids which comprises cultivating the mycelium of *Clitocybe subilludens* in a nutrient medium containing a fruit juice concentrate, and extracting oxytocic alkaloids from the mycelium.

4. The process of making oxytocic alkaloids which comprises cultivating the mycelium of *Clitocybe subilludens* in a nutrient medium containing an orange juice concentrate, and extracting oxytocic alkaloids from the mycelium.

5. The process of making oxytocic alkaloids which comprises cultivating the mycelium of *Clitocybe subilludens* in a nutrient medium containing citrus press water, and extracting oxytocic alkaloids from the mycelium.

6. The process of making oxytocic alkaloids which comprises cultivating the mycelium of *Clitocybe subilludens* in a nutrient medium containing a cereal concentrate, and extracting oxytocic alkaloids from the mycelium.

7. The process of making oxytocic alkaloids which comprises cultivating the mycelium of *Clitocybe subilludens* in a nutrient medium containing corn steep liquor, and extracting oxytocic alkaloids from the mycelium.

8. The process of making oxytocic alkaloids which comprises cultivating the mycelium of *Clitocybe subilludens* in a nutrient medium containing citrus molasses and extracting oxytocic alkaloids from the mycelium.

9. The process of making oxytocic alkaloids which comprises cultivating the mycelium of *Clitocybe subilludens* in a nutrient medium in the presence of a fruit concentrate, and extracting oxytocic alkaloids from the mycelium.

PERRY A. FOOTE.
WERNER M. LAUTER.
ROSS M. BAXTER.

References Cited in the file of this patent

UNITED STATES PATENTS

| Number | Name | Date |
|---|---|---|
| 1,645,096 | Erdmann | Oct. 11, 1927 |

OTHER REFERENCES

Wolf et al., Fungi, 1947, vol. II, Wiley & Sons, Inc., pages 342, 343, 350, 351.

Humfeld et al., Food Technology, 1949, vol. 3, No. 11, pages 355–356.